United States Patent

Monneau et al.

[11] Patent Number: 5,971,346
[45] Date of Patent: Oct. 26, 1999

[54] MOTOR VEHICLE EXHAUST PIPE SUSPENSION; AN ASSEMBLY INCLUDING SUCH A SUSPENSION

[75] Inventors: Jean-Pierre Julien Monneau, St Hilaire S/Yerre; Franck Georges Larmande; Sylvain Sauvage, both of Chateaudun, all of France

[73] Assignee: Hutchinson, Paris, France

[21] Appl. No.: 08/963,925

[22] Filed: Nov. 4, 1997

[30] Foreign Application Priority Data

Nov. 5, 1996 [FR] France ................................. 96-13443

[51] Int. Cl.⁶ ............................................... F16M 13/00
[52] U.S. Cl. ............................................. 248/610; 248/58
[58] Field of Search ............................ 248/58, 59, 60, 248/56, 62, 67.7, 69, 71, 74.1, 74.3, 610, 632, 611, 614, 613, 634; 180/89.2, 309; 181/211; 267/141, 69, 153, 152

[56] References Cited

U.S. PATENT DOCUMENTS

| | | | |
|---|---|---|---|
| 3,977,486 | 8/1976 | Kleinschmit | 180/64 A |
| 4,116,411 | 9/1978 | Masuda | 248/60 |
| 4,361,304 | 11/1982 | Younger | 248/544 |
| 4,380,324 | 4/1983 | Woesler | 248/610 |
| 4,550,795 | 11/1985 | Teshima | 180/296 |
| 4,634,088 | 1/1987 | Schad | 248/60 |
| 4,660,797 | 4/1987 | Tonnies | 248/610 |
| 4,667,920 | 5/1987 | Kleineberg et al. | 248/610 |
| 4,817,909 | 4/1989 | Deane | 248/610 |
| 4,893,778 | 1/1990 | Drabing et al. | 248/610 |
| 5,050,837 | 9/1991 | Hamada et al. | 248/610 |
| 5,127,489 | 7/1992 | Takato et al. | 180/309 |
| 5,271,595 | 12/1993 | Simon et al. | 248/632 |
| 5,398,907 | 3/1995 | Kelchner | 248/634 |
| 5,464,952 | 11/1995 | Shah et al. | 181/211 |
| 5,507,463 | 4/1996 | Kobylinski et al. | 248/610 |
| 5,673,877 | 10/1997 | Karner et al. | 248/58 |
| 5,829,732 | 11/1998 | Yamaguchi et al. | 248/610 |

FOREIGN PATENT DOCUMENTS 0 296 974   6/1988   European Pat. Off. .

Primary Examiner—Leslie A. Braun
Assistant Examiner—Tan Le
Attorney, Agent, or Firm—Marshall, O'Toole, Gerstein, Murray & Borun

[57] ABSTRACT

A suspension for a motor vehicle exhaust pipe, the suspension comprising an upper strength member 3 suitable for securing to the body 5 of the vehicle, and a lower strength member 4 suitable for securing to an exhaust pipe 6, the two strength members being interconnected by a resilient system. Such a suspension is characterized in that said resilient system comprises two crossed resilient loops 1, 2 each incorporating a ring B of material having a high modulus of elasticity that is coated in rubber C, the loops 1, 2 being fixed to each of the strength members 3, 4 at two diametrically-opposite locations of their respective circumferences. The invention also relates to an assembly of such a suspension, the vehicle body, and the exhaust pipe.

8 Claims, 1 Drawing Sheet

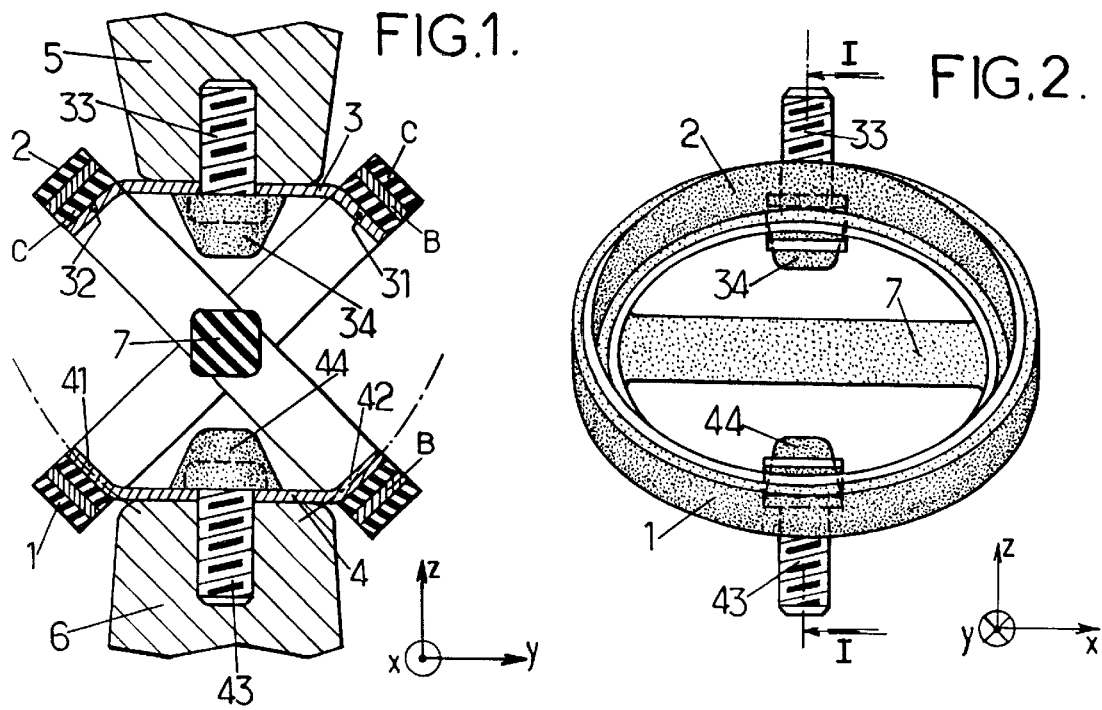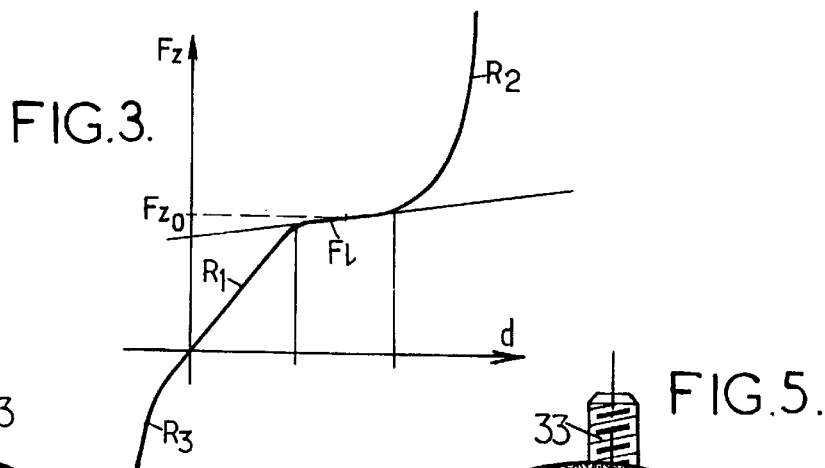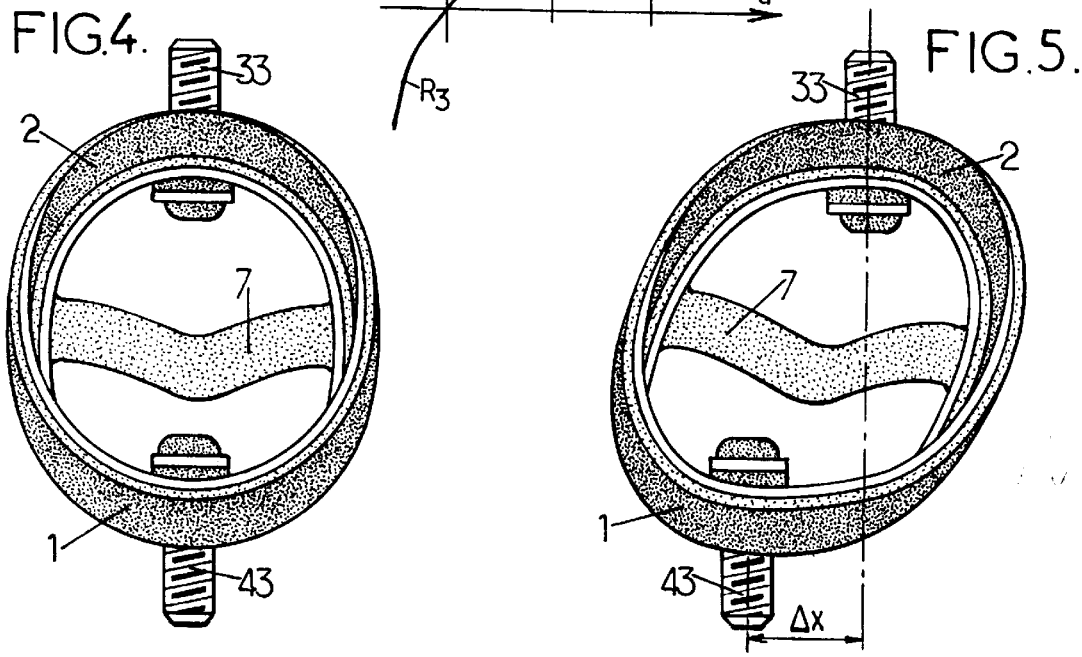

MOTOR VEHICLE EXHAUST PIPE SUSPENSION; AN ASSEMBLY INCLUDING SUCH A SUSPENSION

FIELD OF THE INVENTION

The present invention relates to a suspension for a motor vehicle exhaust pipe, the suspension comprising an upper strength member suitable for securing to the body of the vehicle, and a lower strength member suitable for securing to an exhaust pipe, the two strength members being interconnected by a resilient system.

BACKGROUND OF THE INVENTION

The object of the present invention is to obtain great flexibility for the suspension in the vertical direction (Z direction) under preloading, i.e. when the suspension, secured to the body of a vehicle, is supporting an exhaust pipe at rest; while naturally also ensuring a great increase in stiffness when large forces act on the pipe in the downward vertical direction. It is also necessary to obtain good damping of vibration in the Z direction, so that the exhaust pipe of a vehicle in operation transmits a minimum amount of vibration to the body.

It is also desirable for the suspension to be very flexible in the longitudinal direction of the vehicle (X direction) to accommodate expansion of the exhaust pipe under the effect of temperature.

Finally, a large amount of flexibility must also be obtained relative to forces acting in the transverse direction (Y direction), but with displacement in this direction being limited and, if possible, for this to be achieved without spoiling flexibility in the Z direction.

Presently-known suspensions do not satisfy all of these conditions, particularly with respect to limiting displacement in the transverse or Y direction.

SUMMARY OF THE INVENTION

According to the present invention, the above-mentioned desirable properties are all obtained by a suspension of the type specified at the beginning, characterized in that said resilient system comprises two crossed resilient loops each incorporating a ring of material having a high modulus of elasticity that is coated in rubber, the loops being fixed to each of the strength members at two diametrically-opposite locations of their respective circumferences. By way of example, provision could be made for said loops at rest to be generally circular or slightly elliptical in shape, and to have a cross-section that is flat.

It will be understood that such a suspension can be very flexible relative to vertical traction forces (in the Z direction) acting between the two strength members, since the loops can deform very easily by becoming oval, until the sections extending between the two strength members, originally circular arcs, become sufficiently taut to be nearly rectilinear. As from that moment, the traction stiffness of the rings of material having a high modulus of elasticity in the two loops will take effect, thereby providing the desirable limitation on elongation of the suspension under the effect of vertical forces.

It will also be understood that such a suspension also has great flexibility relative to horizontal forces acting in the transverse direction (Y direction) perpendicular to the vertical midplane of the suspension. Such forces subject only one of the loops to ovalizing extension forces up to the extension limit, and the resulting very low stiffness is increased very little by the presence of the other loop which is subjected, on the contrary, to compression, possibly accompanied by bending. The limit on displacement of the exhaust pipe in this direction is provided only by that one of the loops (depending on the direction of displacement) which is subjected to extension, however that effect is sufficient, given that the forces in the transverse horizontal direction (centrifugal forces while cornering) are in principle smaller than the vertical forces.

Relative to forces acting in the longitudinal horizontal direction (the X direction) perpendicular to the preceding direction, the suspension also provides little stiffness, because of the way the two inclined loops "roll" between the strength members.

As to the effect of damping vibrations relative to the various forces, that is obtained by means of the rubber (natural or synthetic) interposed between the strength members and the reinforcing rings of the loops.

Advantageously, and in order to optimize the above-described effects, the suspension may also be characterized in that the angle at which said loops cross at rest is about 90°, the loops being angularly spaced apart on either side of the vertical midplane of the suspension by an angle of about 45° relative to said plane.

To limit deformation of the loops, while maintaining very low stiffness for the suspension under static forces at rest, it is also possible to make provision so that in the two diametrically-opposite zones where said loops cross, they are secured to each other, said two zones also being interconnected by a diametral resilient strut suitable for being subjected to buckling.

The disposition is such that buckling of the strut takes place as soon as the suspension is supporting the static load of the exhaust pipe, with the strut being caused to buckle by the ovalization of the loops and by the way in which the two said diametrically-opposite zones are then closer together.

Each of the strength members is advantageously constituted by a plate having a central portion suitable for being secured to the body of the vehicle or to said exhaust pipe, together with two end portions serving as supports for said loops and each folded obliquely towards the inside of the corresponding loop.

The folding is naturally a function of the inclination of the loops, so that the plane of each loop extends perpendicularly to the planes of said end portions of the strength members.

The suspension may be also be characterized in that it includes two resilient abutments facing each other and extending towards each other, said abutments being carried by the central portions of each of said plates respectively, thereby making it possible to limit compressing of the suspension under the effect of upward forces exerted thereon by the exhaust pipe.

The present invention also relates to the general disposition of an assembly comprising a vehicle body, a suspension as defined above, fixed to said body, and an exhaust pipe fixed to said suspension.

Given the considerations set out above, such an assembly may be characterized in that the suspension is oriented so that the line interconnecting the diametrically-opposite crossing zones of said loops extends in the same direction as the longitudinal axis of the vehicle.

The assembly may also be characterized in that the static load of said exhaust pipe at rest subjects said loops to forces such that said resilient diametral strut is subjected to buckling.

BRIEF DESCRIPTION OF THE DRAWINGS

An embodiment of the invention is described below by way of non-limiting example with reference to the figures of the accompanying drawing, in which:

FIG. 1 is a section view of the suspension on line I—I of FIG. 2, in an assembly of the invention, the suspension being in the rest state, i.e. not subject to the static load of the exhaust pipe;

FIG. 2 is a side view of the suspension;

FIG. 3 is a graph showing deformation of the suspension in the vertical direction when it is subjected to force $F_z$;

FIG. 4 is a side view of the suspension subjected to the static load of an exhaust pipe; and FIG. 5 is a side view showing the deformation of the suspension when it is subject to longitudinal forces in the X direction.

DETAILED DESCRIPTION

The drawing shows the reference axes, namely the Z axis for vertical forces, the X axis for longitudinal forces (the direction in which the exhaust pipe extends), and the Y axis for transverse forces.

The suspension comprises an outer loop 1 crossed at 90° with an inner loop 2 which passes through the outer loop and which has an outside diameter that, prior to assembly, is slightly greater than the inside diameter of the outer loop 1. As a result, inserting the loop 2 in the loop 1 causes both loops to be ovalized: the loop 2 is enlarged in the vertical direction while the loop 1 is enlarged in the horizontal direction, such that compensation is established enabling the loops to have practically the same sizes between the end folded portions 31–41 and 32–42 of the sheet metal strength members 3 and 4, one of which is connected to the body 5 of the vehicle by a screw 33 and the other of which is connected to the exhaust pipe 6 by a screw 43.

It should be observed that it would also be possible to use two loops that are initially of exactly the same size, thereby considerably increasing the ovalization thereof when they are assembled together. The distances between fixing points would then be different. The problem can nevertheless be solved easily by providing spacing between the folded end portions 31 and 41 against which the outer loop 1 engages that is smaller than the spacing between the folded end portions 32 and 42 against which the inner loop 2 engages, which loop would then be significantly higher than the outer loop. The strength members 3 and 4 would then be asymmetrical, but that is not a drawback, nor does it lead to difficulty in manufacture.

Whatever the embodiment, each of the loops is advantageously constituted by a ring B coated in natural or synthetic rubber C and bonded to the plates 3 and 4 at their folded ends 31–32 and 41–42. The rings may be made of any suitable material having a high modulus of elasticity: metal fabric, glass or carbon fibers, metal strip, etc.

7 designates a horizontal strut of rubber interconnecting the two diametrically-opposite zones of the inner loop 2 at the level where it joins the outer loop 1. Rubber may be overmolded on these junction zones to avoid any discontinuity between the loops and to hold them together at this location. FIG. 4 shows how the strut 7 buckles when the suspension is subjected to a static force $F_{z_o}$ corresponding to the weight of the exhaust pipe at rest. FIG. 3 is a graph showing vertical elongation d of the suspension as a function of the vertical force $F_z$ exerted thereon by the exhaust pipe. It can be seen that on either side of the buckling zone $F_1$, stiff responses $R_1$ and $R_2$ are obtained, the lower zone $R_1$ being due to the high compression stiffness of the strut 4 prior to buckling, and the upper zone $R_2$ being due to the rings B of the loops being stretched. The stiff zone $R_3$ corresponds to the suspension coming into abutment when the exhaust pipe 6 exerts a vertical upward force thereon. This abutment can be conveniently obtained via rubber blocks 34 and 44 molded over the heads of the screws 33 and 43 and suitable for coming into abutment on either side of the strut 7 when the suspension is compressed.

In FIG. 1, circular chain-dotted arcs show how the support points 41 and 42 move when the exhaust pipe 6 subjects the suspension to transverse forces, with the resilient and limiting effects described above.

Finally, FIG. 5 shows how the suspension deforms when the exhaust pipe 6, e.g. under the effect of expansion Δx, subjects it to longitudinal forces. The loops are then deformed a little which explains why the suspension continues to have low stiffness in the X direction, disturbing vertical stiffness (in the Z direction) little, regardless of the offset in the X direction.

We claim:

1. A suspension for a motor vehicle exhaust pipe, the suspension comprising an upper strength member (3) suitable for securing to a body (5) of the vehicle, and a lower strength member (4) suitable for securing to an exhaust pipe (6), the two strength members being interconnected by a resilient system, the suspension being characterized in that said resilient system comprises two crossed resilient loops (1, 2) each incorporating a ring (B) of material having a high modulus of elasticity that is coated in rubber (C), the loops (1, 2) being fixed to each of the strength members (3, 4) at two diametrically-opposite locations of their respective circumferences.

2. A suspension according to claim 1, characterized in that an angle at which said loops (1, 2) cross at rest is about 90°, the loops being angularly spaced apart on either side of a vertical midplane of the suspension by an angle of about 45° relative to said plane.

3. A suspension according to claim 1 or 2, characterized in that in the two diametrically-opposite zones where said loops (1, 2) cross they are secured to each other, said two zones also being interconnected by a diametral resilient strut (7) suitable for being subjected to buckling.

4. A suspension according to claim 1, characterized in that said loops (1, 2) at rest are generally circular or slightly elliptical in shape, and are of flat cross-section.

5. A suspension according to claim 1, characterized in that each of said strength members is constituted by a plate (3, 4) having a central portion suitable for being secured to the body (5) of the vehicle or to said exhaust pipe (6), and two end portions (31, 32; 41, 42) serving as supports for said loops (1, 2), each being folded obliquely towards the inside of the corresponding loop.

6. A suspension according to claim 5, characterized in that it includes two resilient abutments (34, 44) facing each other and extending towards each other, said abutments being carried by central portions of each of said plates (3, 4) respectively.

7. An assembly comprising a vehicle body (5), a suspension according to claim 1 fixed to said body, and an exhaust pipe (6) fixed to said suspension, the assembly being characterized in that the suspension is oriented so that a line interconnecting the diametrically-opposite crossing zones of said loops (1, 2) extends in the same direction as the longitudinal axis (X) of the vehicle.

8. An assembly according to claim 7, wherein the suspension is characterized in that in the two diametrically-opposite zones where said loops (1, 2) cross they are secured to each other, said two zones also being interconnected by a diametral resilient strut (7) suitable for being subjected to buckling and further characterized in that said exhaust pipe (6) has a static load at rest, said static load subjecting said loops (1, 2) to forces such that said diametral resilient strut (7) is subjected to buckling.

* * * * *